Patented Dec. 17, 1940

2,225,375

UNITED STATES PATENT OFFICE 2,225,375

PROCESS OF OBTAINING STEROL GLUCO-SIDES AND STEROLS FROM FATTY SUB-STANCES

Henry R. Kraybill and Max Horsley Thornton, West Lafayette, Ind., assignors to Purdue Research Foundation, West Lafayette, Ind., a corporation of Indiana No Drawing. Application October 3, 1938, Serial No. 233,030

7 Claims. (Cl. 260—397)

It is the object of our invention to obtain sterols from fatty substances which contain them, including oils and oil sludges, and more especially from soybean oil, cottonseed oil, wheat-germ oil, peanut oil, corn oil, and fish-liver oil.

The invention in this present application is correlated with inventions set forth in two copending applications filed by us in conjunction with Pearl H. Brewer, Serial No. 122,218, filed January 25, 1937, and Serial No. 171,984, filed October 30, 1937, but goes beyond the inventions set forth in those applications.

According to the process of the present application, fatty substances which contain sterols are brought, in a liquid state, into intimate contact with an adsorbent material (defined hereinafter) which has a high affinity for phosphatides and mucilages, so that it adsorbs those phosphatides and mucilages from those fatty substances; and with the phosphatides and mucilages so adsorbed there is also adsorbed from the fatty substances a large part of the sterols and practically all of the sterol glucosides which the fatty substances may contain. This adsorption process thus separates the fatty substances into two fractions—the fraction that is adsorbed and the fraction that is not adsorbed.

When that adsorbent material with the adsorbed material on it is treated with acetone, the acetone extracts the adsorbed sterols and much of the adsorbed sterol glucosides, while leaving on the adsorbent material substantially all the phosphatides and mucilages. This extraction process with acetone thus separates the first fraction into two sub-fractions.

When that acetone extract is subjected to evaporation to drive off the acetone and any water that may be present, there remains an oil in which there is a substantially white precipitate if the original fatty substances contained sterol glucosides; and the precipitate, if any, and the oil are separated in any convenient manner, as by filtering or centrifuging. That precipitate consists mainly of sterol glucosides, and contains most of the sterol glucosides that were adsorbed on the adsorbent material; but the oil after removal of those sterol glucosides contains practically all of the sterols which were adsorbed.

This sterol-containing oil may be re-subjected to the process just described, if desired; and it is desirable to do it if water was present in the original fatty substances, to ensure substantially complete removal of phosphatides and mucilages.

The oil thus obtained is an oil that is rich in sterols, and that is substantially free from phosphatides, mucilages, and sterol glucosides.

The oil that is a filtrate from the adsorbent material, or the combined filtrates if there are several filtrations, is also an oil that contains sterols and that is substantially free from phosphatides, mucilages, and sterol glucosides.

Thus both of these oils, or oil-fractions, are sources of sterols. By our invention we recover the sterols from such phosphatide-free and mucilage-free oil; desirably after obtaining such phosphatide-free and mucilage-free oils by the aforesaid adsorption process.

The oil remaining as a residue from the acetone extract in the case of soybean oil may contain sterols to the extent of about 0.5% to 0.75%; whereas the original soybean oil may contain sterols to the extent of about 0.20%, and the filtrate of soybean oil from the adsorption step may contain sterols to the extent of about 0.10%. With cottonseed oil the amounts are somewhat higher. With other oils the percentages vary with the nature of the oil; and of course there is some variation in the same class of oils, even in soybean oil.

In recovering the sterols from these oils, or oil-fractions, we proceed as follows:

First we extract the substantially phosphatide-free and mucilage-free oil or oil-fraction with an organic sterol-dissolving solvent that is substantially immiscible with the oil when cold (0° C. to room temperature). Examples of such solvents are methyl alcohol, ethyl alcohol, propyl alcohol, isopropyl alcohol, ethylene glycol, and propylene glycol. The extraction may be done by any usual extraction procedure of extracting one liquid with another, either at room temperature or at elevated temperature; for any mixing which occurs at elevated temperature may be made substantially to disappear by cooling, as to room temperature or in a refrigerator.

On standing, with such cooling as may be necessary, the two layers separate because of such immiscibility; and may be removed one from the other in any convenient manner, as by a separatory funnel.

The layer of solvent contains the greater part of the sterols, the proportions depending upon the extent to which the extraction is carried; and it may also contain a relatively small amount of the oil because of the impossibility of absolute immiscibility.

The solvent layer is now subjected to evaporation to drive off the solvent, leaving an oily residue due which contains sterols in much greater concentration than does the original phosphatide-free oil—usually in excess of 2.0% in the case of soybean oil or cottonseed oil. This oily residue may if desired be extracted again with a sterol-dissolving solvent immiscible with it, either the same one or a different one from that used before; and the solvent layer separated and subjected to evaporation to obtain an oily residue with an even higher content of sterols. This extraction procedure may be repeated several times.

When these oily residues, whether the first or a subsequent one, are cooled, to room temperature or in a refrigerator, the sterols contained in them are crystallized out to a large extent, usually in a very pure form, often of the order of 98% to over 99%. The crystallization of the sterols is helped by cooling to low temperature, as by refrigeration. The crystals formed are suitably separated, as by filtering or centrifuging.

This crystallizing out of the sterols in this high purity is dependent on the freedom of our oil or oil-fraction from phosphatides and mucilages.

As so far described, it is contemplated that the sterols are obtained without saponification of the oil of the final concentrate, and we prefer that procedure both because of its simplicity and because it does not destroy the oil; although after obtaining our oil concentrate it is possible to use known saponification procedures.

The sterols obtained by our process may be separated into groups or into individual sterols by known processes.

The adsorbent material which we use may be of various types, so long as it has a sufficiently high affinity for phosphatides and mucilages that on intimate contact with the fatty substances it will adsorb those phosphatides and mucilages substantially completely; for along with those phosphatides and mucilages it also adsorbs substantially all the sterol glucosides and much of the sterols of those fatty substances. Any solid inorganic adsorbent material may be used of which a 20-gram lot is capable of adsorbing from 200 grams of a crude soybean oil of between 0.06% and 0.08% phosphorous content at least enough phosphorous-containing material to reduce the phosphorous content of the oil to one-third of its original value. Among such adsorbent materials are Lloyd's reagent and certain other treated aluminum silicates, precipitated tricalcium phosphate, and some artificial zeolites; and two excellent adsorbent materials are the silica foam which is described in the co-pending application of Brewer and Kraybill, Serial No. 121,573, filed January 21, 1937, and the specially prepared sodium aluminum silicates which are described in the co-pending application of Kraybill, Brewer, and Thornton, Serial No. 121,572, filed January 21, 1937. These are mentioned merely by way of example, for any adsorbent material may be used which complies with the condition defined above.

We claim as our invention:

1. The process of obtaining sterols from a fatty substance which has been substantially freed from phosphatides and mucilages, which consists in extracting such substantially phosphatide-free and mucilage-free fatty substance with an organic sterol-dissolving solvent that when cold is substantially immiscible with the oil, separating the solvent and its contained solutes from the oil, and separating sterols from the solvent.

2. The process of obtaining sterols from a fatty substance, which consists in bringing it in liquid state into intimate contact with an adsorbent of which a 20-gram lot is capable of adsorbing from 200 grams of a crude soybean oil of between 0.06% and 0.08% phosphorous content at least enough phosphorous-containing material to reduce the phosphorous content of the oil to one-third its original value, extracting the oil remaining after such adsorption with an organic sterol-dissolving solvent that when cold is substantially immiscible with the oil, separating the solvent and its contained solutes from the oil, and separating sterols from the solvent.

3. The process of obtaining sterols from a fatty substance, which consists in bringing it in liquid state into intimate contact with an adsorbent of which a 20-gram lot is capable of adsorbing from 200 grams of a crude soybean oil of between 0.06% and 0.08% phosphorous content at least enough phosphorous-containing material to reduce the phosphorous content of the oil to one-third its original value, extracting with acetone the adsorbent material with the adsorbed material thereon, subjecting the acetone extract to evaporation to leave an oily residue which after filtration is rich in sterols but is substantially free from phosphatides and mucilages and largely free from sterol glucosides, extracting that oily residue with an organic sterol-dissolving solvent that when cold is substantially immiscible with the oil, separating the solvent and its contained solutes from the oil, and separating sterols from the solvent.

4. The process of obtaining sterols from a fatty substance, which consists in bringing it in liquid state into intimate contact with an adsorbent of which a 20-gram lot is capable of adsorbing from 200 grams of a crude soybean oil of between 0.06% and 0.08% phosphorous content at least enough phosphorous-containing material to reduce the phosphorous content of the oil to one-third its original value, extracting with acetone the adsorbent material with the adsorbed material thereon, subjecting the acetone extract to evaporation to leave an oily residue which after filtration is rich in sterols but is substantially free from phosphatides and mucilages and largely free from sterol glucosides, so that there are two oil-fractions of which one is the residue from the acetone extract and the other is the filtrate after treatment with the adsorbent material, extracting at least one of those oil-fractions with an organic sterol-dissolving solvent that when cold is substantially immiscible with the oil, separating the solvent and its contained solutes from the oil, and separating sterols from the solvent.

5. The process of obtaining sterols from a fatty substance which has been substantially freed from phosphatides and mucilages, which consists in extracting such substantially phosphatide-free and mucilage-free fatty substance with an organic sterol-dissolving solvent that when cold is substantially immiscible with the oil, separating the solvent and its contained solutes from the oil, and separating sterols from the solvent by evaporation of the solvent and lowering the temperature of the remaining oily residue to cause crystallization of sterols.

6. The process of obtaining sterols from a fatty substance, which consists in separating it by selective adsorption into two fractions of which one contains the phosphatides and mucilages and sterol glucosides and some of the sterols and the other is an oil which contains the remainder of the sterols, extracting the first fraction with acetone to separate it into two sub-fractions of which the first is an oil which contains the sterols and some of the sterol glucosides of the first fraction but substantially none of the phosphatides and mucilages and the second contains the remainder of the first fraction, extracting one or both of the oils constituting the second fraction and the first sub-fraction of the first fraction with an organic sterol-dissolving solvent which when cold is substantially immiscible with the oil, and separating the sterols from the solvent.

7. The process of obtaining sterols from a fatty substance, which consists in separating it by selective adsorption into a portion which contains phosphatides and mucilages and a portion which contains sterols but is substantially free from phosphatides and mucilages, extracting the second portion with an organic sterol-dissolving solvent which when cold is substantially immiscible with the oil, and separating the sterols from the solvent.

HENRY R. KRAYBILL.
MAX HORSLEY THORNTON.